(12) United States Patent
Horikawa et al.

(10) Patent No.: US 11,164,318 B2
(45) Date of Patent: Nov. 2, 2021

(54) IMAGE RECOGNITION APPARATUS, METHOD, AND PROGRAM FOR ENABLING RECOGNITION OF OBJECTS WITH HIGH PRECISION

(71) Applicant: Sony Interactive Entertainment Inc., Tokyo (JP)

(72) Inventors: Tsutomu Horikawa, Kanagawa (JP); Daichi Ono, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 7 days.

(21) Appl. No.: 16/621,729

(22) PCT Filed: Jul. 18, 2017

(86) PCT No.: PCT/JP2017/025974
§ 371 (c)(1),
(2) Date: Dec. 12, 2019

(87) PCT Pub. No.: WO2019/016870
PCT Pub. Date: Jan. 24, 2019

(65) Prior Publication Data
US 2020/0111215 A1   Apr. 9, 2020

(51) Int. Cl.
*G06T 7/11* (2017.01)
*G06T 7/70* (2017.01)
*G06K 9/20* (2006.01)

(52) U.S. Cl.
CPC .............. *G06T 7/11* (2017.01); *G06K 9/2054* (2013.01); *G06T 7/70* (2017.01)

(58) Field of Classification Search
CPC ............ G06K 9/2054; G06T 7/70; G06T 7/11
See application file for complete search history.

(56) References Cited

U.S. PATENT DOCUMENTS 7,680,295 B2 * 3/2010 Yoda ....................... G06F 3/017
382/100
9,082,013 B2   7/2015 Kenichi
(Continued)

FOREIGN PATENT DOCUMENTS

| JP | 2009123234 A | 6/2009 |
| JP | 2016018538 A | 2/2016 |
| WO | 2013118218 A1 | 8/2013 |

OTHER PUBLICATIONS

Office Action for corresponding JP Application No. 2019-530271, 6 pages, dated Sep. 15, 2020.
(Continued)

*Primary Examiner* — Mia M Thomas
(74) *Attorney, Agent, or Firm* — Matthew B. Dernier, Esq.

(57) ABSTRACT

Provided are an image recognition apparatus, an image recognition method, and a program for enabling recognition of many kinds of objects with high precision. An overall recognition unit executes, for at least one given object, a process of recognizing the position of the object in an image. A partial image extraction unit extracts, from the image, a partial image which is a part of the image associated with the recognized position. A partial recognition unit executes a process of recognizing what is one or more objects represented by the partial image, the one or more objects including an object other than the given object the position of which is recognized.

7 Claims, 6 Drawing Sheets

(56) References Cited

U.S. PATENT DOCUMENTS

| | | | |
|---|---|---|---|
| 10,204,283 B2 | 2/2019 | Shunta | |
| 2014/0112530 A1* | 4/2014 | Yadani | G06K 9/72 |
| | | | 382/103 |
| 2016/0012277 A1* | 1/2016 | Tate | G06K 9/34 |
| | | | 382/159 |
| 2019/0114491 A1* | 4/2019 | Takaki | G06K 9/00805 |
| 2019/0279045 A1* | 9/2019 | Li | G06K 9/3241 |
| 2020/0234431 A1* | 7/2020 | Kim | G01V 8/10 |
| 2021/0063376 A1* | 3/2021 | Li | G01N 33/204 |

OTHER PUBLICATIONS

International Search Report for corresponding PCT Application No. PCT/JP2017/025974, 2 pages, dated Oct. 17, 2018.
International Preliminary Report on Patentability and Written Opinion for corresponding PCT Application No. PCT/JP2017/025974, 12 pages, dated Jan. 30, 2020.

* cited by examiner

| PARTIAL RECOGNITION TARGET DATA | MOVEMENT-AND-DEFORMATION RULE DATA | PARTIAL RECOGNITION MODEL ID |
|---|---|---|
| TABLE | UPWARD MOVEMENT BY 40%, HEIGHT TO 60% | 1 |
| BOOKSHELF | HEIGHT TO 85%, WIDTH TO 85% | 2 |
| | | |

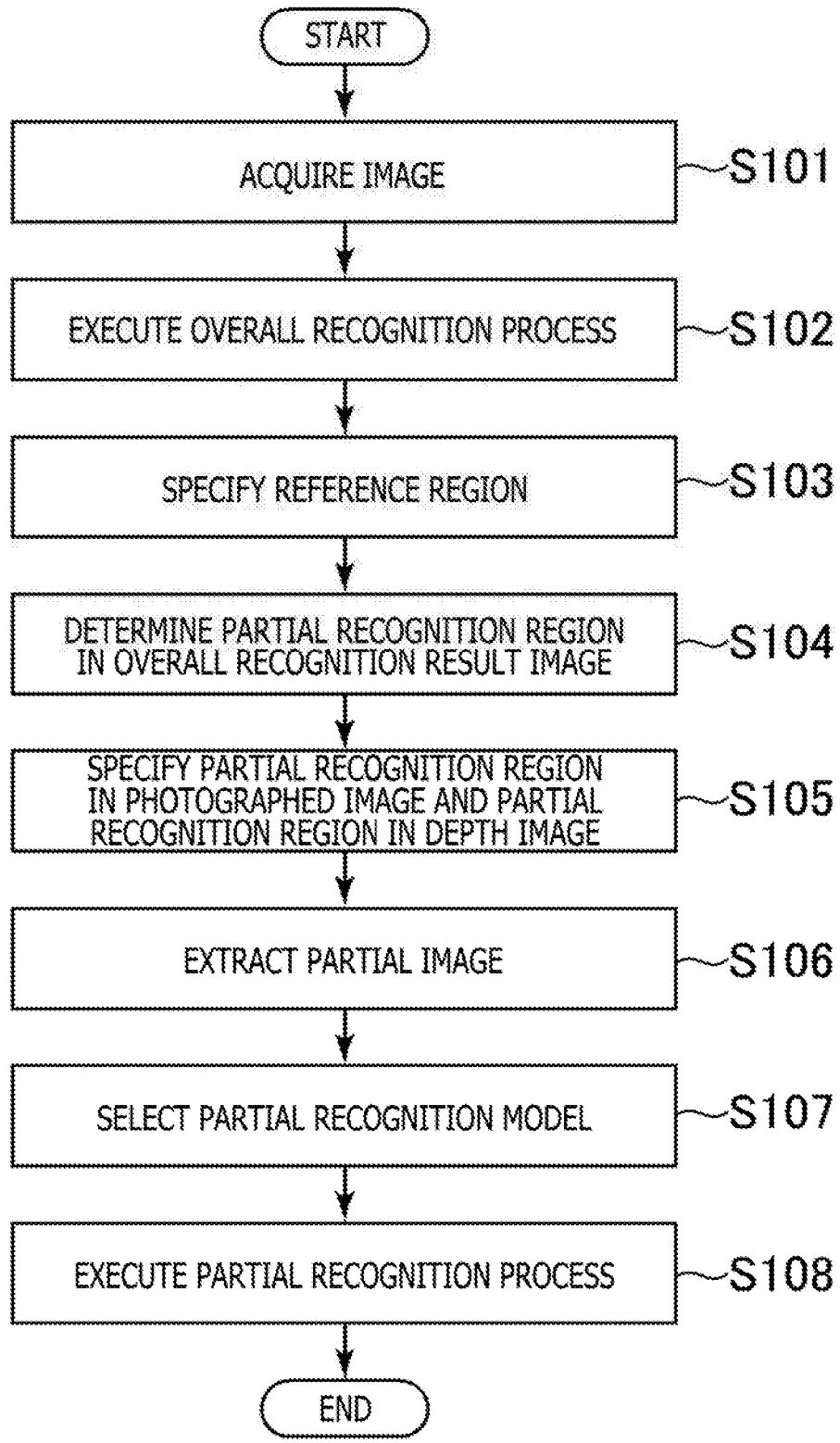

IMAGE RECOGNITION APPARATUS, METHOD, AND PROGRAM FOR ENABLING RECOGNITION OF OBJECTS WITH HIGH PRECISION

TECHNICAL FIELD

The present invention relates to an image recognition apparatus, an image recognition method, and a program.

BACKGROUND ART

An image recognition technique of recognizing, on the basis of an output obtained upon input of an image to be recognized to a learned model, an object represented by the image or the position of the object represented in the image, has been known. For example, for each pixel included in an inputted image, meaning of the pixel, such as an object represented by the pixel, is specified by a technique called as semantic segmentation.

SUMMARY

Technical Problem

When many kinds of objects are intended to be discriminatingly recognized by image recognition, the possibility of false recognition is increased because the difference among respective feature amounts associated with the objects becomes small.

The present invention has been made in view of the aforementioned problems, and one object thereof is to provide an image recognition apparatus, an image recognition method, and a program for enabling recognition of many kinds of objects with high precision.

Solution to Problem

In order to solve the aforementioned problems, an image recognition apparatus according to the present invention includes a first recognition unit that executes, for at least one given object, a process of recognizing a position of the given object in an image, a partial image extraction unit that extracts, from the image, a partial image which is a part of the image associated with the recognized position, and a second recognition unit that executes a process of recognizing what is one or more objects represented by the partial image, the one or more objects including an object other than the given object the position of which is recognized.

One aspect of the present invention further includes a model selection unit that selects, from among a plurality of learned models, a learned model corresponding to the given object the position of which is recognized, in which the second recognition unit executes the process of recognizing what is an object represented by the partial image, by using the selected learned model.

Furthermore, in one aspect of the present invention, the partial image extraction unit extracts the partial image occupying a region obtained by moving or deforming a region, in the image, where the given object the position of which is recognized is represented, on a basis of a rule corresponding to the object.

In this aspect, the partial image extraction unit may extract the partial image occupying a region obtained by moving a region, in the image, where the given object the position of which is recognized is represented, in a direction corresponding to the object.

Alternatively, the partial image extraction unit may extract the partial image occupying a region obtained by enlarging or reducing a region, in the image, where the given object the position of which is recognized is represented, to a size corresponding to the object.

Moreover, an image recognition method according to the present invention includes a step of executing, for at least one given object, a process of recognizing a position of the given object in an image, a step of extracting, from the image, a partial image which is a part of the image associated with the recognized position, and a step of executing a process of recognizing what is one or more objects represented by the partial image, the one or more objects including an object other than the given object the position of which is recognized.

In addition, a program according to the present invention causes a computer to execute a procedure of executing, for at least one given object, a process of recognizing a position of the given object in an image, a procedure of extracting, from the image, a partial image which is a part of the image associated with the recognized position, and a procedure of executing a process of recognizing what is one or more objects represented by the partial image, the one or more objects including an object other than the given object the position of which is recognized.

BRIEF DESCRIPTION OF DRAWINGS

FIG. 10 is a flowchart depicting one example of the flow of processing which is executed by the image recognition apparatus according to the embodiment of the present invention.

DESCRIPTION OF EMBODIMENT

Hereinafter, an embodiment of the present invention will be explained in detail on the basis of the drawings.

Figure 1:
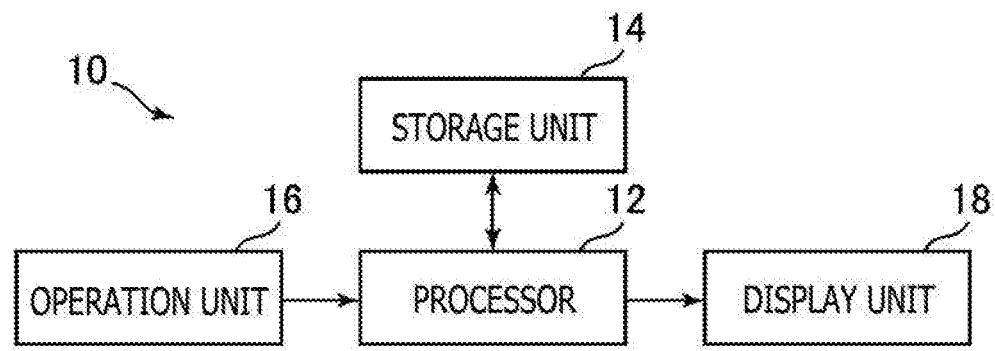
FIG. 1 is a configuration diagram of an image recognition apparatus according to an embodiment of the present invention.

FIG. 1 is a configuration diagram of an image recognition apparatus 10 according to the embodiment of the present invention. The image recognition apparatus 10 according to the present embodiment is a computer such as a game console or a personal computer, for example. As depicted in FIG. 1, the image recognition apparatus 10 according to the present embodiment includes a processor 12, a storage unit 14, an operation unit 16, and a display unit 18, for example.

The processor 12 is a program control device, such as a central processing unit (CPU), which is operated in accordance with a program installed in the image recognition apparatus 10, for example.

The storage unit 14 is a storage element such as a read only memory (ROM) or a random access memory (RAM), or is a hard disk drive, for example. A program to be executed by the processor 12, etc., is stored in the storage unit 14.

The operation unit 16 is a user interface such as a keyboard, a mouse, a controller of the game console, and receives an operation input from a user and outputs a signal indicative of the details of the input to the processor 12.

The display unit 18 is a display device such as a liquid crystal display, and displays various images in accordance with a command from the processor 12.

Note that the image recognition apparatus 10 may include a communication interface such as a network board, an optical disk drive for reading optical disks such as digital versatile disc (DVD)-ROMs or Blu-ray (registered trademark) disks, and a universal serial bus (USB) port, etc.

Figure 2:
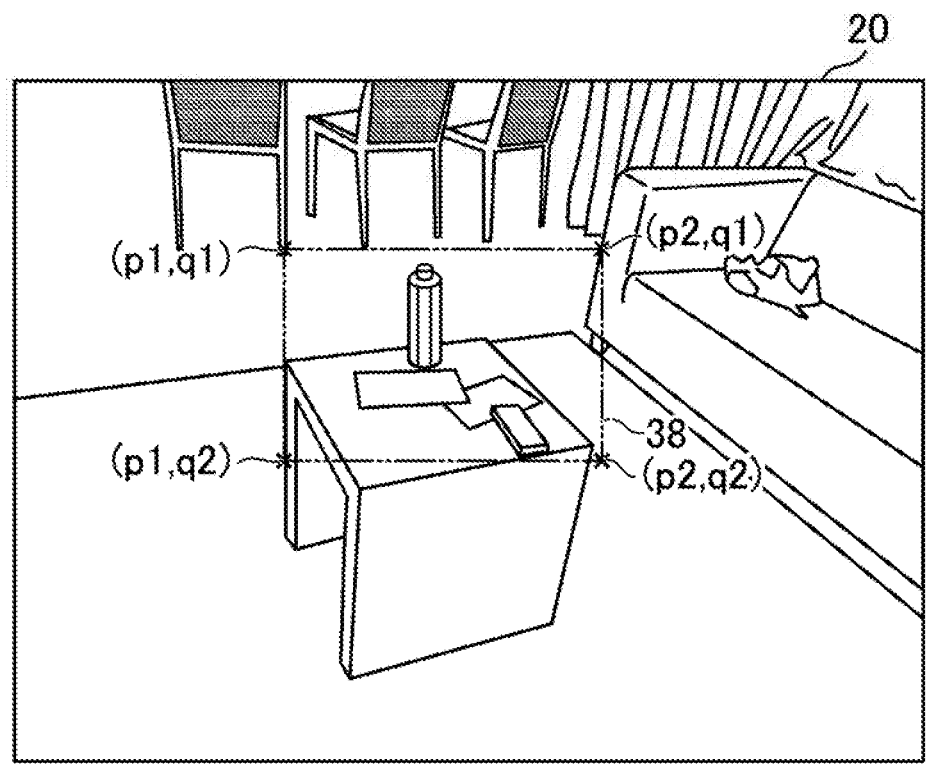
FIG. 2 is a diagram depicting one example of a photographed image.
Figure 2:
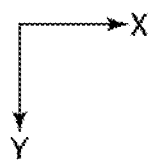

FIG. 2 is a diagram depicting one example of a photographed image 20 to be subjected to image recognition by the image recognition apparatus 10. The photographed image 20 is an image obtained by photographing a subject in a real space with a camera such as a digital camera, for example.

Figure 3:
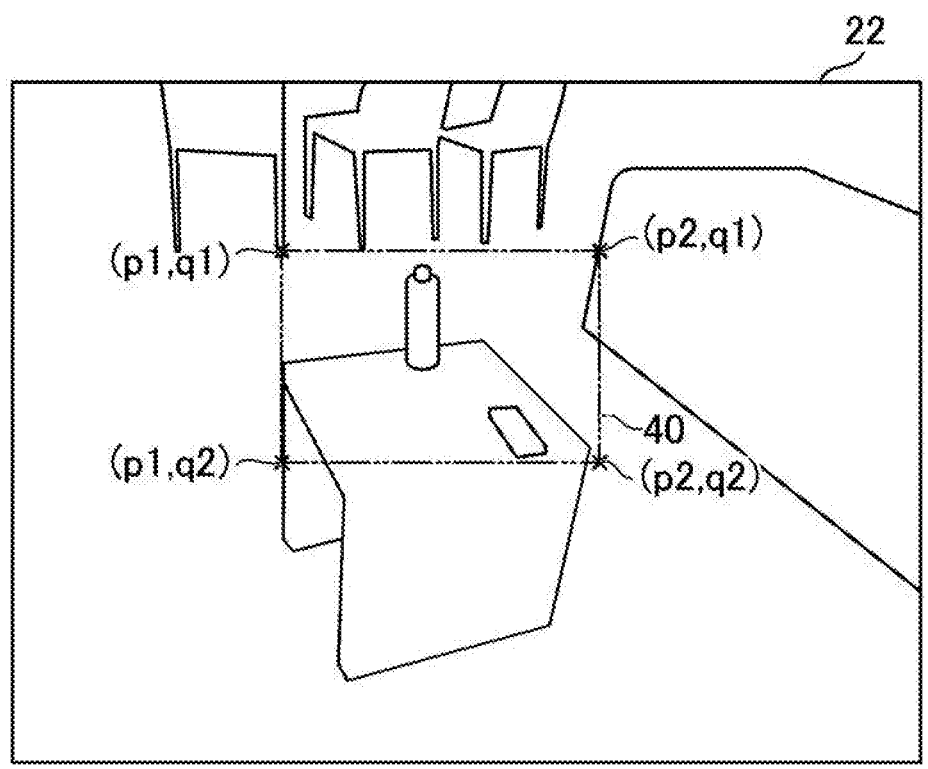
FIG. 3 is a diagram depicting one example of a depth image.
Figure 3:
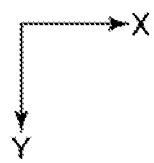

FIG. 3 is a diagram depicting one example of a depth image 22 which is associated with the photographed image 20 depicted in FIG. 2. The depth image 22 represents distribution of distances from the camera to the subject, which are associated with respective pixels included in the photographed image 20.

The photographed image 20 depicted in FIG. 2 may be an image obtained by photographing a subject in a real space with a camera, such as a stereo camera or an infrared ranging sensor-provided camera, which is capable of taking a photographed image associated with depth information. In this case, an image corresponding to the depth information may be the depth image 22 depicted in FIG. 3.

Further, depth information which is associated with the position, the orientation, and the view angle of the camera at the time of photographing the photographed image 20 may be generated on the basis of the photographed image taken by photographing a subject from a plurality of directions, for example. The depth image 22 depicted in FIG. 3 may be generated on the basis of the depth information.

In the present embodiment, first image recognition and second image recognition are executed on the photographed image 20 and the depth image 22. In the present embodiment, the first image recognition is executed on the entire photographed image 20 and the entire depth image 22. The second image recognition is executed on a part of the photographed image 20 and a part of the depth image 22. Hereinafter, the first image recognition of the present embodiment is referred to as overall recognition, and the second image recognition of the present embodiment is referred to as partial recognition.

Figures 4, 5:
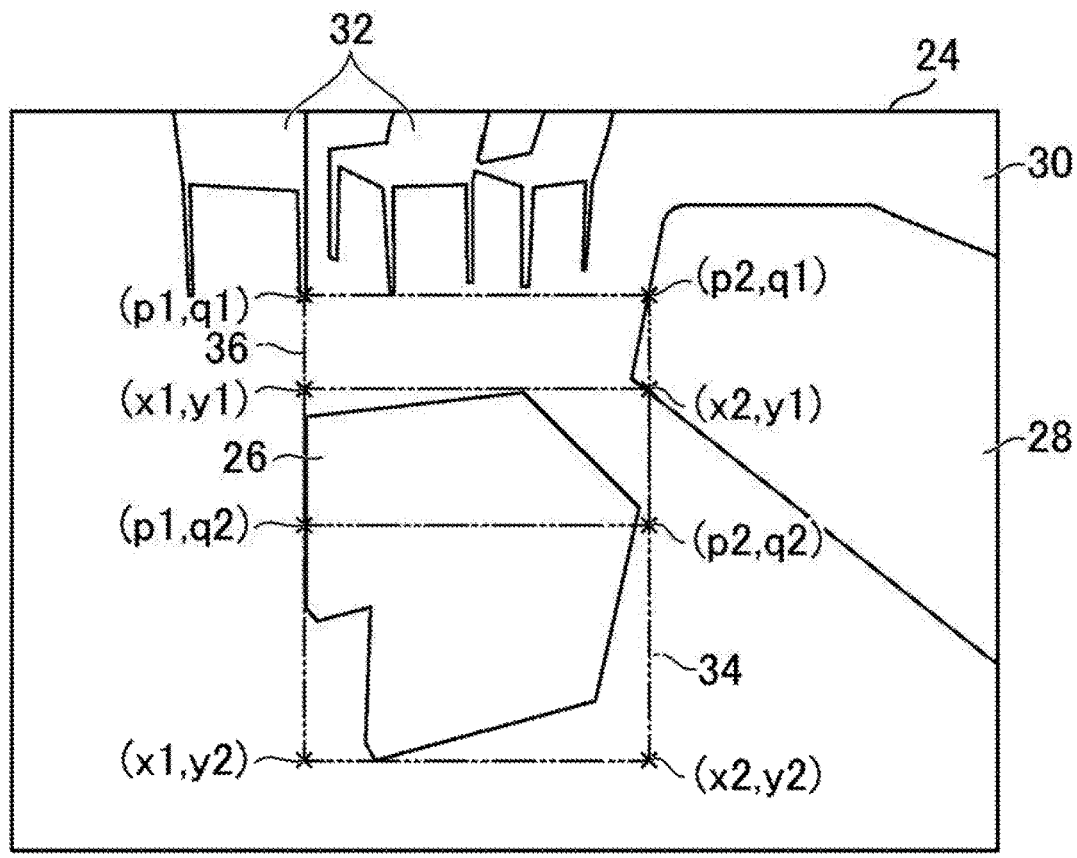
FIG. 4 is a diagram depicting one example of an overall recognition result image.
FIG. 5 is a diagram depicting one example of partial recognition management data.

In the present embodiment, the photographed image 20 and the depth image 22 are first inputted to a learned model for use in the overall recognition. The learned model enables recognition of objects such as a table, a couch, a curtain, chairs, and a bookshelf, depicted in the image, which are disposed in a room, for example. The learned model to which the photographed image 20 and the depth image 22 are inputted in the overall recognition is not limited to a particular type. The learned model may be a two-dimensional convolutional neural network (two-dimensional CNN) having executed learning for semantic segmentation, for example. In response to the above input, a result of the image recognition executed on the photographed image 20 and the depth image 22 is outputted from the learned model. FIG. 4 depicts one example of an overall recognition result image 24 which is one example of the execution result.

In the following explanation, the right direction and the down direction are defined as an X-axis positive direction and a Y-axis position direction, respectively, throughout the photographed image 20, the depth image 22, and the overall recognition result image 24. In addition, the photographed image 20, the depth image 22, and the overall recognition result image 24 are assumed to have the same shape and the same size.

As depicted in FIG. 4, the overall recognition result image 24 is divided, on a pixel basis, into a plurality of regions which are associated to respective categories each corresponding to an object as a recognition result. In the overall recognition result image 24, a table region 26 which is associated with a table, a couch region 28 which is associated with a couch, a curtain region 30 which is associated with a curtain, and chair regions 32 which are each associated with a chair, are depicted, for example. Here, like the chair regions 32, a plurality of separated regions may be recognized as regions of the same category. Further, the position of a pixel in the overall recognition result image 24 is associated with the position of a pixel in the photographed image 20 and with the position of a pixel in the depth image 22.

In the present embodiment, a region, in the overall recognition result image 24 in which a specific object is represented, associated with an object of a predetermined specific category is specified as a reference region 34. Hereinafter, an object of this specific category is referred to as a partial recognition target.

Here, the partial recognition target may be set in partial recognition management data depicted in FIG. 5. As depicted in FIG. 5, the partial recognition management data includes partial recognition target data, movement-and-deformation rule data, and partial recognition model identifiers (IDs), for example.

The partial recognition target data indicates the name of the partial recognition target, for example. The movement-and-deformation rule data indicates a rule for determining a partial recognition region 36, which will be explained later, on the basis of the reference region 34, for example. The partial recognition model IDs are identification information regarding learned models for use in partial recognition which is executed on a partial image occupying the partial recognition region 36, for example.

FIG. 5 depicts partial recognition management data in which the partial recognition target data value is a table, and partial recognition management data in which the partial recognition target data value is a bookshelf. Accordingly, in this case, the partial recognition targets are a table and a bookshelf. In this case, a region, in the overall recognition result image 24, associated with the table region 26 may be specified as the reference region 34, as depicted in FIG. 4.

Here, for example, a rectangular region circumscribed on the table region 26 may be specified as the reference region 34, as depicted in FIG. 4. Alternatively, a region obtained by adding a margin region to the rectangular region circumscribed on the table region 26, may be specified as the reference region 34. For example, a region that is concentric with the rectangular region circumscribed on the table region 26 and that has longitudinal and lateral lengths longer than those of the rectangular region by respective predetermined lengths, may be specified as the reference region 34. Also, for example, a region that is concentric with the rectangular region circumscribed on the table region 26 and that has a predetermined-fold size, which is larger than a one-fold size, of the rectangular region, may be specified as the reference region 34.

Subsequently, in the present embodiment, the partial recognition region 36 to be subjected to partial recognition is determined on the basis of the reference region 34. Here, for example, a region obtained by moving or deforming the reference region 34 in accordance with a given rule corresponding to the partial recognition target, such as the movement-and-deformation rule data depicted in FIG. 5, may be determined as the partial recognition region 36. Alternatively, a region obtained by moving the reference region 34 in a direction corresponding to the partial recognition target, may be determined as the partial recognition region 36. Alternatively, a region obtained by enlargement or reduction to a size corresponding to the partial recognition target, may be determined as the partial recognition region 36.

For example, in the example in FIG. 5, for the partial recognition management data in which the partial recognition target data value is a table, "upward movement by 40%, height to 60%" is set as the movement-and-deformation rule data value. In this case, a region obtained by moving the reference region 34 upward (in the Y-axis negative direction) by 40% of the height thereof, and then, reducing the height of the resultant image to 60% while keeping the center position thereof unchanged, may be determined as the partial recognition region 36, as depicted in FIG. 4, for example.

A rectangular region having vertexes the coordinate values of which are (x1, y1), (x1, y2), (x2, y1), and (x2, y2) is assumed to be set as the reference region 34, as depicted in FIG. 4. Further, a rectangular region having vertexes the coordinate values of which are (p1, q1), (p1, q2), (p2, q1), and (p2, q2) is assumed to be determined as the partial recognition region 36 on the basis of the reference region 34. In this case, according to the aforementioned example, the relationships p1=x1, p2=x2, q1=1.2y1−0.2y2, and q2=0.6y1+0.4y2 are established.

Subsequently, in the present embodiment, the position and size of a partial recognition region 38 in the photographed image 20, and the position and size of a partial recognition region 40 in the depth image 22 are determined on the basis of the position and size of the partial recognition region 36 in the overall recognition result image 24.

Here, a region in the photographed image 20 corresponding to the partial recognition region 36 in the overall recognition result image 24 may be specified as the partial recognition region 38. For example, a rectangular region, in the photographed image 20, having vertexes the coordinate values of which are (p1, q1), (p1, q2), (p2, q1), and (p2, q2) may be specified as the partial recognition region 38. Also, a region in the depth image 22 corresponding to the partial recognition region 36 in the overall recognition result image 24 may be specified as the partial recognition region 40. For example, a rectangular region, in the depth image 22, having vertexes the coordinate values of which are (p1, q1), (p1, q2), (p2, q1), and (p2, q2), may be specified as the partial recognition region 40.

Figure 6:
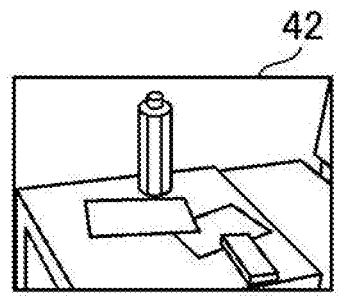
FIG. 6 is a diagram depicting one example of a partial photographed image.
Figure 7:
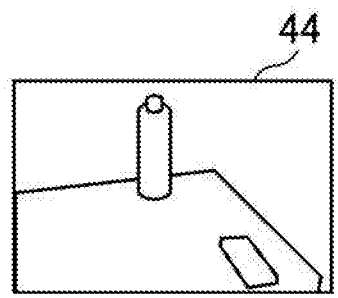
FIG. 7 is a diagram depicting one example of a partial depth image.

Subsequently, in the present embodiment, a partial photographed image 42 which is a part of the photographed image 20 occupying the partial recognition region 38 and which is depicted in FIG. 6, is extracted from the photographed image 20. Also, a partial depth image 44 which is a part of the depth image 22 occupying the partial recognition region 38 and which is depicted in FIG. 7, is extracted from the depth image 22.

Subsequently, in the present embodiment, partial recognition is executed on the partial photographed image 42 and the partial depth image 44. In the present embodiment, a plurality of learned models are preliminarily prepared for use in execution of the partial recognition. In the present embodiment, for example, from among the plurality of learned models, a learned model for executing the partial recognition on the partial photographed image 42 and the partial depth image 44, is selected on the basis of the partial recognition target recognized by overall recognition.

Here, the learned model for executing the partial recognition on the partial photographed image 42 and the partial depth image 44, may be selected on the basis of the partial recognition management data depicted in FIG. 5, for example. In the example in FIG. 5, 1 is set as the partial recognition model ID of the partial recognition management data in which the partial recognition target data value is a table. In this case, a model having an identification information value of 1 is selected as the learned model for executing the partial recognition on the partial photographed image 42 and the partial depth image 44. Here, for example, the model having an identification information value of 1 may be a model capable of recognizing an object related to the partial recognition target corresponding to the model. For example, the model having an identification information value of 1 may be a model capable of recognizing a table and objects disposed on the table, such as a plastic bottle, a cup, a plate, and the table, depicted in the image.

Figure 8:
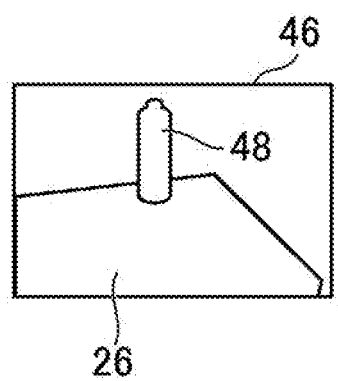
FIG. 8 is a diagram depicting one example of a partial recognition result image.

Here, the learned model to which the photographed image 20 and the depth image 22 are inputted in the partial recognition, is not limited to a particular type. The learned model may be a two-dimensional convolutional neural network (two-dimensional CNN) having executed learning for semantic segmentation, for example. Then, in response to the above input, a result of the image recognition executed on the partial photographed image 42 and the partial depth image 44 is outputted from the learned model. FIG. 8 depicts one example of a partial recognition result image 46, which is one example of the execution result.

In the partial recognition result image 46, the table region 26 which is associated with a table, and a plastic bottle region 48 which is associated with a plastic bottle disposed on the table are represented. In this example, the plastic bottle which has not been recognized by the overall recognition is recognized by the partial recognition.

In the aforementioned example, partial images each corresponding to an area on the table are extracted as the partial photographed image 42 and the partial depth image 44. Accordingly, an object disposed on the table can be appropriately recognized by the partial recognition.

Note that the case where the table region 26 is included in the overall recognition result image 24 has been explained above. However, in some cases, a bookshelf region which is associated with a bookshelf is included in the overall recognition result image 24. In such a case, a region obtained by reducing the height and width of the reference region 34 corresponding to the bookshelf region to 85% while keeping the center position thereof unchanged, on the basis of the partial recognition management data having the partial recognition target data value of a bookshelf depicted in FIG. 5, for example, may be determined as the partial recognition region 36. Then, the partial photographed image 42 occupying the partial recognition region 38 in the photographed image 20 corresponding to the partial recognition region 36, and the partial depth image 44 occupying the partial recognition region 40 in the depth image 22 corresponding to the partial recognition region 36, may be extracted. Then, partial recognition using a model having an identification information value of 2 may be executed on the partial photographed image 42 and the partial depth image 44. Here, the model having an identification information value of 2 may be a learned model capable of recognizing each of books and magazines represented in the image, or the titles of the books and magazines, for example.

In this case, partial images each corresponding to the inside of the bookshelf are extracted as the partial photographed image 42 and the partial depth image 44. Accordingly, an object disposed in the bookshelf can be appropriately recognized by the partial recognition.

For example, image recognition using a learned model capable of recognizing many kinds of objects including a table, a couch, a curtain, a chair, a bookshelf, a plastic bottle, a cup, and a plate may be executed on the photographed image 20 and the depth image 22. However, when many kinds of objects are intended to be recognized by the image recognition in this manner, the difference among respective feature amounts associated with the objects becomes small. This increases the possibility of false recognition.

To this end, the present embodiment first executes overall recognition of recognizing a limited number of kinds of objects. In the aforementioned example, the overall recognition of recognizing objects such as a table, a couch, a curtain, a chair, and a bookshelf is executed on the photographed image 20 and the depth image 22. Then, by using a preferable model corresponding to the result of overall recognition, the partial recognition of recognizing a limited number of kinds of objects, which include an object having not been recognized by the overall recognition, is executed, according to the result of overall recognition, on partial images extracted on the basis of the result of overall recognition. In the aforementioned example, in the partial photographed image 42 and the partial depth image 44, a limited number of kinds of table-related objects such as a plastic bottle, a cup, a plate, and the table are recognized.

As explained so far, according to the image recognition apparatus 10 according to the present embodiment, many kinds of objects can be recognized with high precision.

Hereinafter, the functions of the image recognition apparatus 10 according to the present embodiment and processing which is executed by the image recognition apparatus 10, will be further explained.

Figure 9:
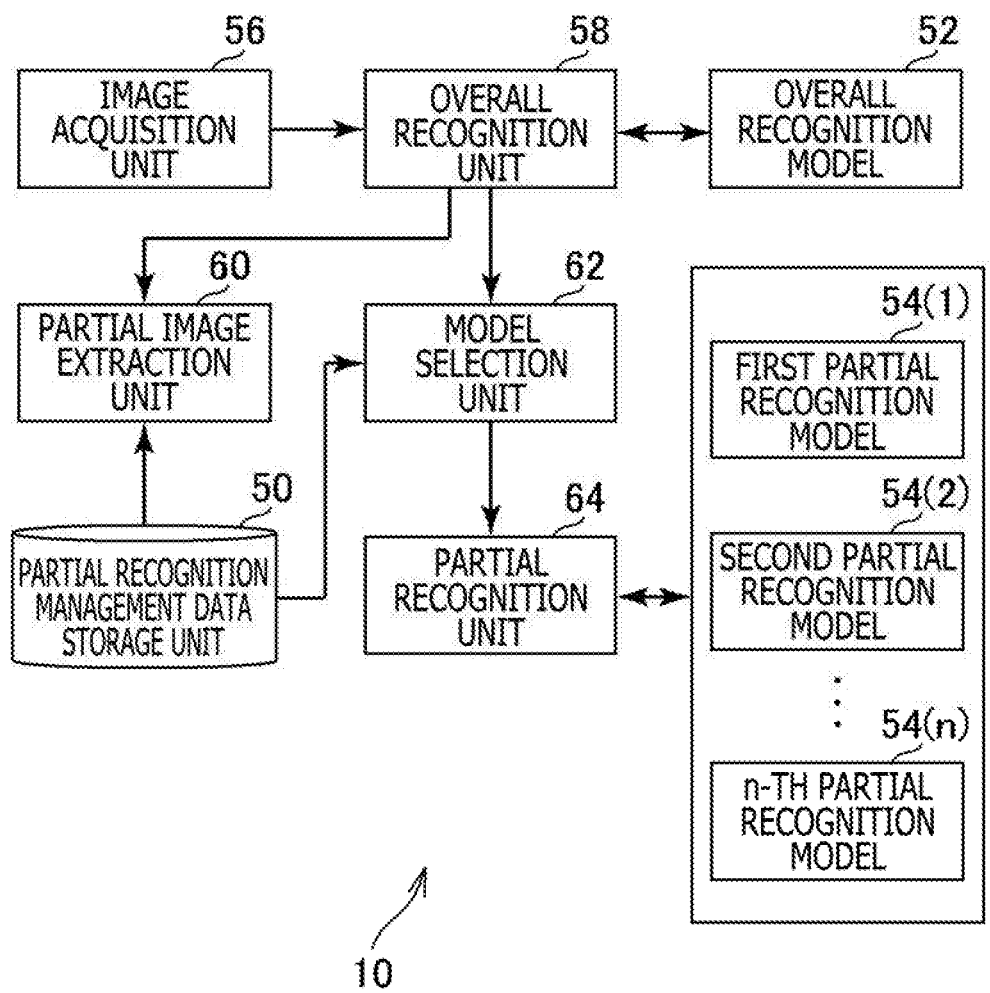
FIG. 9 is a functional block diagram depicting one example of functions implemented by the image recognition apparatus according to the embodiment of the present invention.

FIG. 9 is a functional block diagram depicting one example of functions implemented by the image recognition apparatus 10 according to the present embodiment. Note that all the functions depicted in FIG. 9 do not need to be implemented by the image recognition apparatus 10 according to the present embodiment. In addition, a function other than the functions depicted in FIG. 9 may be implemented.

As depicted in FIG. 9, the image recognition apparatus 10 functionally includes a partial recognition management data storage unit 50, an overall recognition model 52, a plurality of partial recognition models 54 (a first partial recognition model 54(1), a second partial recognition model 54(2), . . . , a n-th partial recognition model 54(n)), an image acquisition unit 56, an overall recognition unit 58, a partial image extraction unit 60, a model selection unit 62, and a partial recognition unit 64, for example. These components are mainly implemented by the processor 12 and the storage unit 14.

These functions may be implemented by the processor 12 executing a program that is installed in the image recognition apparatus 10 which is a computer and that includes commands corresponding to these functions. This program may be supplied to the image recognition apparatus 10 via a computer readable information storage medium such as an optical disk, a magnetic disk, a magnetic tape, a magneto-optical disk, or a flash memory, or via the Internet or the like.

In the present embodiment, for example, the partial recognition management data storage unit 50 stores the partial recognition management data depicted in FIG. 5.

In the present embodiment, for example, the overall recognition model 52 is a learned model for use in overall recognition. For example, the overall recognition model 52 may be a two-dimensional CNN having executed supervised learning using learning data that includes, as input data, an image representing an object, such as a table, a couch, a curtain, a chair, or a bookshelf, disposed in a room, and that includes, as teacher data, an image, such as the overall recognition result image 24, divided into regions by categories.

In the present embodiment, for example, the partial recognition models 54 are learned models for use in partial recognition. Each of the partial recognition models 54 according to the present embodiment is associated with partial recognition management data. For example, the first partial recognition model 54(1) is associated with partial recognition management data having a partial recognition model ID of 1, and the second partial recognition model 54(2) is associated with partial recognition management data having a partial recognition model ID of 2. In the present embodiment, the partial recognition models 54 and objects are associated with each other via the partial recognition management data. For example, the first partial recognition model 54(1) is associated with a table, and the second partial recognition model 54(2) is associated with a bookshelf.

Further, each of the partial recognition models 54 may be a learned model capable of recognizing an object that is associated with the partial recognition model 54 via the partial recognition management data. Also, for example, the partial recognition models 54 may be learned models capable of recognizing different objects.

For example, the first partial recognition model 54(1) is a learned model capable of recognizing objects including a table and objects disposed on the table such as a plastic bottle, a cup, a plate, and the table. Here, the first partial recognition model 54(1) may be a two-dimensional CNN having executed supervised learning using learning data that includes, as input data, an image representing a situation where objects such as a plastic bottle, a cup, a plate, and a table are disposed on a table, and that includes, as teacher data, an image, such as the partial recognition result image 46, divided into regions by categories.

Also, for example, the second partial recognition model 54(2) may be a learned model capable of recognizing each of books and magazines and the titles thereof. Here, for example, the second partial recognition model 54(2) may be a two-dimensional CNN having executed supervised learning using learning data that includes, as input data, an image representing a bookshelf in which books and magazines are housed, and that includes, as teacher data, an image, such as the partial recognition result image 46, divided into regions by categories.

In the present embodiment, for example, the image acquisition unit 56 acquires an image to be subjected to overall recognition. For example, the image acquisition unit 56 acquires the photographed image 20 and the depth image 22.

In the present embodiment, for example, the overall recognition unit 58 executes, for at least one given object, a process of recognizing the position of the given object in the image acquired by the image acquisition unit 56. The given object refers to any one of objects such as a table and a bookshelf which are set as the partial recognition targets in the partial recognition management data depicted in FIG. 5, for example. Here, the overall recognition unit 58 may execute an overall recognition process on the image acquired by the image acquisition unit 56, by using the overall recognition model 52. For example, the overall recognition unit 58 generates, as a result of the overall recognition, the overall recognition result image 24 which is an output obtained upon input of the photographed image 20 and the depth image 22 to the overall recognition model 52.

In the present embodiment, for example, the partial image extraction unit 60 extracts, from the image acquired by the image acquisition unit 56, a partial image which is a part of the acquired image and is associated with the position of the given object in the acquired image.

Here, for example, the partial image extraction unit 60 may specify, as the reference region 34 in the overall recognition result image 24, a region corresponding to any one of the objects indicated as the partial recognition target data values of the partial recognition management data depicted in FIG. 5. Further, for example, a region obtained by moving or deforming the reference region 34 in accordance with a rule indicated by the movement-and-deformation rule data associated with the partial recognition target data, may be determined as the partial recognition region 36. Here, a region obtained by moving the reference region 34 in a direction corresponding to the partial recognition target, may be determined as the partial recognition region 36. Alternatively, a region obtained by enlarging or reducing to a size corresponding to the partial recognition target, may be determined as the partial recognition region 36.

Subsequently, the partial image extraction unit 60 may determine the partial recognition region 38 in the photographed image 20 and the partial recognition region 40 in the depth image 22, which each correspond to the determined partial recognition region 36.

Subsequently, from the photographed image 20, the partial image extraction unit 60 may extract, as the partial photographed image 42, a partial image occupied by the partial recognition region 38 in the photographed image 20. Moreover, from the depth image 22, the partial image extraction unit 60 may extract, as the partial depth image 44, a partial image occupied by the partial recognition region 40 in the depth image 22.

In the present embodiment, for example, the model selection unit 62 selects, from among the plurality of partial recognition models 54, a partial recognition model that is associated with the object recognized by the overall recognition. Here, for example, the partial recognition model 54 that is associated with the partial recognition target may be selected. For example, the partial recognition model 54 having learned an image of an object related to the partial recognition target and being capable of recognizing the object related to the partial recognition target, may be selected. For example, the partial image extraction unit 60 is assumed to extract the partial photographed image 42 and the partial depth image 44 on the basis of the table region 26. In this case, the model selection unit 62 may select the first partial recognition model 54(1) associated with 1 which is the partial recognition model ID of the partial recognition management data having a partial recognition target data value indicating a table.

In the present embodiment, for example, the partial recognition unit 64 executes a process of recognizing what is one or more objects that are represented by the partial image extracted by the partial image extraction unit 60 and that include an object other than the given object the position of which is recognized. The partial recognition unit 64 may executes a process of recognizing what is an object represented by the partial image extracted by the partial image extraction unit 60, by using the selected partial recognition model 54, for example. For example, the partial recognition unit 64 generates, as a result of the partial recognition, the partial recognition result image 46 which is an output obtained upon input of the partial photographed image 42 and the partial depth image 44 to the first partial recognition model 54(1).

Here, one example of the flow of processing which is executed by the image recognition apparatus 10 according to the present embodiment will be explained with reference to a flowchart depicted in FIG. 10.

First, the image acquisition unit 56 acquires the photographed image 20 and the depth image 22 (S101).

Then, the overall recognition unit 58 executes an overall recognition process on the photographed image 20 and the depth image 22 by using the overall recognition model 52 (S102). Here, for example, the overall recognition result image 24 depicted in FIG. 4 may be generated.

Then, the partial image extraction unit 60 specifies, as the reference region 34, a region, in the overall recognition result image 24, associated with an object that is set as any one of the partial recognition target data values of the partial recognition management data depicted in FIG. 5 (S103). Here, for example, the reference region 34 associated with the table region 26 may be specified.

Then, the partial image extraction unit 60 determines the partial recognition region 36 in the overall recognition result image 24 (S104). Here, for example, a region obtained by moving or deforming the reference region 34 in accordance with a rule indicated by the movement-and-deformation rule data value associated with the partial recognition target data value in the partial recognition management data depicted in FIG. 5, may be determined as the partial recognition region 36.

Then, the partial image extraction unit 60 specifies the partial recognition region 38 in the photographed image 20 and the partial recognition region 40 in the depth image 22 each associated with the partial recognition region 36 determined in the process indicated by S104 (S105).

Then, the partial image extraction unit 60 extracts partial images (S106). Here, for example, a partial image occupying the partial recognition region 38 in the photographed image 20 may be extracted as the partial photographed image 42, and a partial image occupying the partial recognition region 40 in the depth image 22 may be extracted as the partial depth image 44.

Then, the model selection unit 62 selects the partial recognition model 54 to be used for partial recognition (S107). Here, for example, the partial recognition model 54 (e.g., the first partial recognition model 54(1)) identified by the partial recognition model ID corresponding, in the partial recognition management data, to the partial recognition target represented in the reference region 34 specified in the process indicated by S103, may be selected.

Then, the partial recognition unit 64 may execute a partial recognition process on the partial images extracted in the process indicated in S106 by using the partial recognition model 54 selected in the process indicated in S107 (S108), and the processing indicated in the present processing example is ended. In the process indicated in S108, the partial recognition result image 46 depicted in FIG. 8 may be generated, for example.

Note that overall recognition is executed on the photographed image 20 and the depth image 22 in the aforementioned example, but overall recognition may be executed only on the photographed image 20. Also, partial recognition is executed on the partial photographed image 42 and the partial depth image 44 in the aforementioned example, but partial recognition may be executed only on the partial photographed image 42.

Moreover, for example, a plurality of partial images respectively associated with different partial recognition targets may be extracted from an image subjected to overall recognition. For example, a partial image associated with a table and a partial image associated with a bookshelf may be extracted. In this case, partial recognition using the different partial recognition models 54 may be executed on the partial images. For example, partial recognition using the first partial recognition model 54(1) may be executed on the partial image associated with a table, and partial recognition using the second partial recognition model 54(2) may be executed on the partial image associated with a bookshelf.

Also, for example, each of the partial recognition models 54 may be a learned model capable of recognizing an object classified into a sub-category for objects recognized by the overall recognition model 52.

For example, it is assumed that the overall recognition unit 58 recognizes a position where a quadruped is represented in an image subjected to overall recognition. Further, it is assumed that the partial image extraction unit 60 extracts, from the image subjected to overall recognition, a partial image occupying a partial recognition region associated with an animal. In this case, the partial recognition unit 64 may input the partial image to the partial recognition model 54 having learned an image of an object classified to a sub-category of quadruped animals such as a dog, a cat, and a tiger. Then, the partial recognition unit 64 may infer the kind of the quadruped animal represented in the partial image on the basis of an output obtained upon input of the partial image to the partial recognition model 54.

Similarly, for example, it is assumed that the partial image extraction unit 60 extracts, from an image subjected to overall recognition, a partial image occupying a partial recognition region that is associated with a tree. In this case, for example, the partial recognition unit 64 may infer the kind of the tree represented in the partial image on the basis of an output obtained upon input of the partial image to the partial recognition model 54 that is capable of recognizing the kind of a tree such as a cherry, a plum, or a pine.

In addition, for example, the overall recognition unit 58 may be execute a process of specifying a region to attract attention, from an image subjected to overall recognition, by using a visual attention technique. Then, the partial image extraction unit 60 may extract, from the image subjected to overall recognition, a partial image occupying the region to attract attention. Also, the partial image extraction unit 60 may extract, from the image subjected to overall recognition, a partial image occupying the partial recognition region 36 in the case where the reference region 34 is set as the region to attract attention.

Note that the present invention is not limited to the aforementioned embodiment.

In addition, the specific character stings and numerical values in the above explanation, and the character stings and numerical values in the drawings are given as examples, and no limitation is imposed on these character stings and numerical values.

The invention claimed is:

1. An image recognition apparatus comprising:
a first recognition unit that executes, for at least one given object, a process of recognizing a position of the given object in an image, and a type category within which the object is classified;
a partial image extraction unit that moves or deforms a region, where the given object is represented, so as to include an entirety of the given object, and extracts, from the image, a partial image occupying the region; and
a second recognition unit that executes a process of recognizing, based on the category, what is a kind of one or more objects represented by the partial image, the one or more objects being classified in a subcategory of the category and including the given object and an object other than the given object.

2. The image recognition apparatus according to claim 1, further comprising:
a model selection unit that selects, from among a plurality of learned models, a learned model corresponding to the given object, wherein
the second recognition unit executes the process of recognizing what is is the kind of object represented by the partial image, by using the selected learned model.

3. The image recognition apparatus according to claim 1, wherein the partial image extraction unit extracts the partial image on a basis of a rule corresponding to the given object.

4. The image recognition apparatus according to claim 3, wherein the partial image extraction unit extracts the partial image by moving the region in a direction corresponding to the given object.

5. The image recognition apparatus according to claim 3, wherein the partial image extraction unit extracts the partial image by enlarging or reducing the region to a size corresponding to the given object.

6. An image recognition method comprising:
executing, for at least one given object, a process of recognizing a position of the given object in an image, and a type category within which the object is classified;
moving or deforming a region, where the given object is represented, so as to include an entirety of the given object, and extracting, from the image, a partial image occupying the region; and
executing a process of recognizing, based on the category, what is a kind of one or more objects represented by the partial image, the one or more objects being classified in a subcategory of the category and including the given object and an object other than the given object.

7. A non-transitory, computer-readable storage medium containing a program, which when executed by a computer, causes the computer to carry out actions, comprising:
executing, for at least one given object, a process of recognizing a position of the given object in an image, and a type category within which the object is classified;
moving or deforming a region, where the given object is represented, so as to include an entirety of the given object, and extracting, from the image, a partial image occupying the region; and
executing a process of recognizing, based on the category, what is a kind of one or more objects represented by the partial image, the one or more objects being classified in a subcategory of the category and including the given object and an object other than the given object.

* * * * *